INVENTORS
CHARLES R. KENRICK.
HAROLD B. SCHULTZ.
BY-
Richard G. Geib
ATTORNEY.

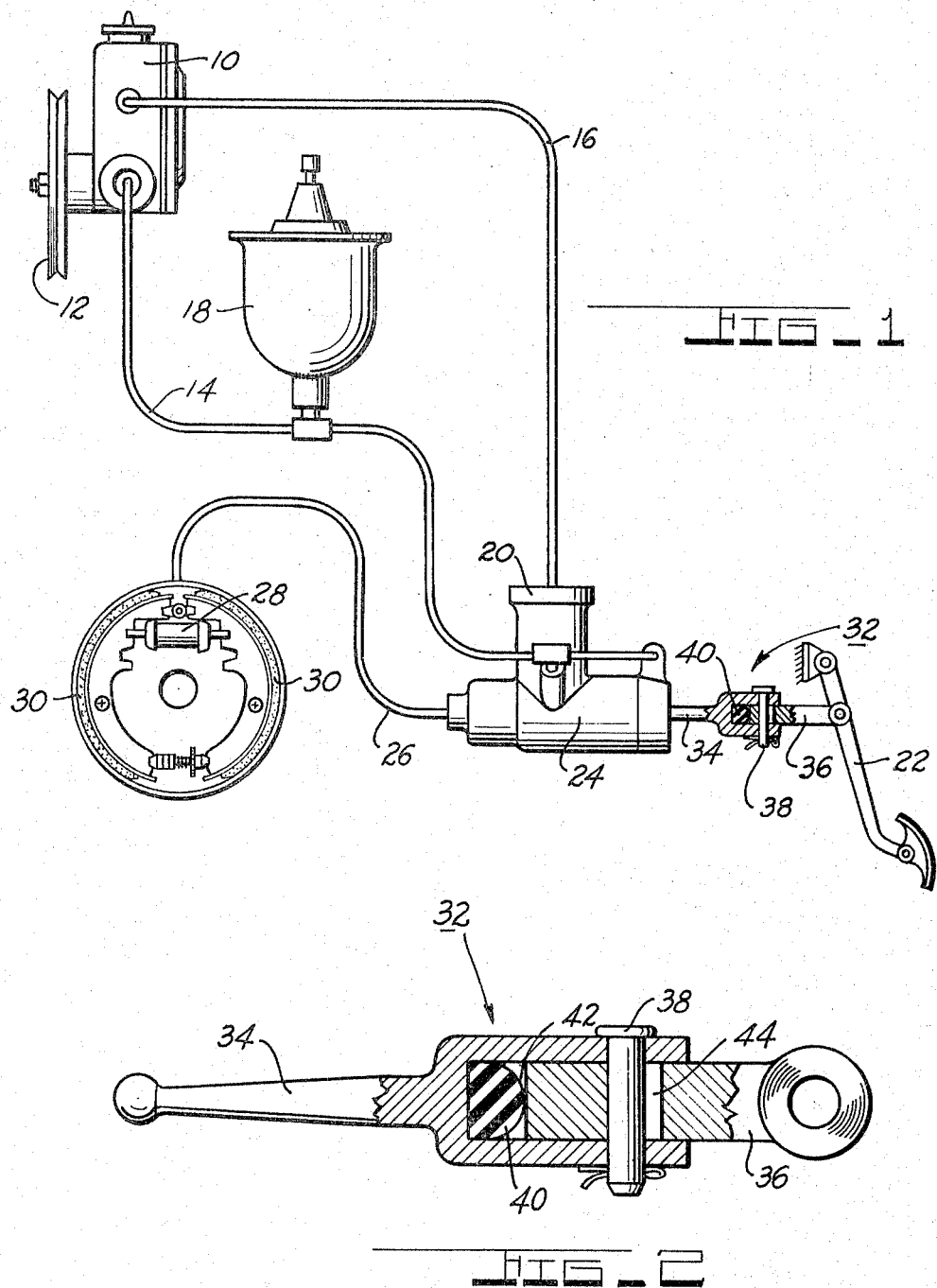

INVENTORS
**CHARLES R. KENRICK.
HAROLD B. SCHULTZ.**
BY
*Richard G. Geib*
ATTORNEY.

United States Patent Office 3,302,481
Patented Feb. 7, 1967

3,302,481
BRAKE CONTROL MEANS
Charles R. Kenrick and Harold B. Schultz, South Bend,
Ind., assignors to The Bendix Corporation, South Bend,
Ind., a corporation of Delaware
Filed Sept. 24, 1964, Ser. No. 398,957
3 Claims. (Cl. 74—512)

The present invention relates to a hydraulic power brake means and more particularly to the linkage interposed between a brake control valve and a brake pedal.

In the present state of the automotive art, considerable engineering talent is being directed to the problem of reducing the driving effort required of the vehicle operator. For some years, power-assist accessories have been in use which supplement the driver's manual effort with power from another source. For example, with a power-assist brake the operator is called upon for about 50% of the normal pedal effort required with a fully manual brake.

As a further improvement in the art, systems are being developed for the full hydraulic power application of brakes. With a full hydraulic power system, an outside source provides all the energy for applying the brakes. The operator is required to merely activate the system; for example, by manipulation of a foot-controlled brake valve. In a sense, the brake system of a vehicle is thus transformed from a travel sensitive mechanism to a pressure sensitive mechanism. Such a power system has the advantage of not only reducing the braking effort but also providing an instantly responsive brake. The pressure sensitive feature is brought about in that an operator of a brake pedal is called upon to merely open or close a valve.

However, with a full hydraulic brake system the mere cracking of the valve immediately provides an ample amount of high pressure fluid to actuate the vehicle brakes. One of the problems of getting use to such a system is the lack of any significant pedal movement which normally accompanies the increase in pedal force and line pressure. It is, therefore, a principal intent of our invention to provide a device which will indicate brake operation to the operator without affecting the fast response of such a power brake system.

Another object of our invention is to provide a control rod for a brake system valve having a resilient means to reduce the harshness of reaction of a full power hydraulic brake system.

A further object of our invention is to provide a control rod between a brake control valve and a brake pedal that is constructed to have a deformable member operatively arranged between the brake control valve and the brake pedal such that the member must be completely deformed to a solid state to provide an integral link between the pedal and control valve.

It is a still further object of our invention to provide a load spring installation in a control rod connecting a brake control valve and a brake pedal to provide a sense of pedal position, as well as brake pressure to the operator.

A still further object of our invention is to provide a connecting means for a brake control valve and a brake pedal which is in the form of a lost motion connection whose lost motion is eliminated at a predetermined pressure, above which point brake pressure response will be in proportion to pedal force only and below which point brake pressure response will be in proportion to pedal position and pedal force.

Other and further objects will be observed by those skilled in the art to which our invention relates from observation of the following description of the accompanying drawings in which:

FIGURE 1 is a schematic presentation of one form of power braking system which could utilize a device in accordance with the principles of our invention;

FIGURE 2 is a cross sectional view of a device such as may be utilized in the brake system of FIGURE 1 designed in accordance with the principles of our invention;

Figure 3:
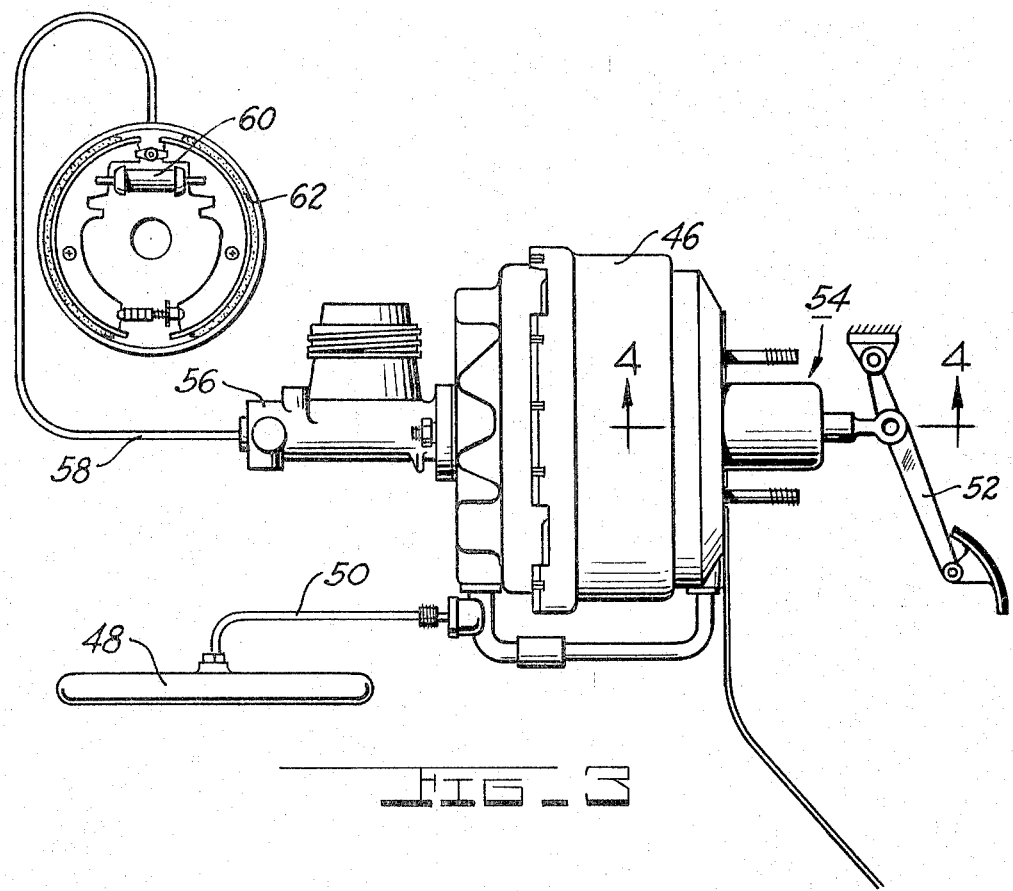
FIGURE 3 is a schematic presentation of yet another power braking system which could utilize a device in accordance with the principle of our invention.

With particular reference to FIGURE 1 we show a vehicle hydraulic full power braking system employing a pump 10 having a pulley 12 driven by an engine fan belt. The pump is connected by means of conduits 14 and 16 to a hydraulic accumulator 18 and a brake control valve reservoir 20, respectively. A brake pedal 22 is pivotally arranged within the vehicle so as to operate a valve within valve body 24 to schedule pressurized fluid from accumulator 18 through the valve body to the conduit 26 and thence to a wheel cylinder 28 to apply the brake shoes 30. As seen, the brake pedal 22 is connected to the valve within body 24 by means of a push rod assembly 32 formed by a control rod portion 34 and a pedal link 36 connected by means of a pin 38.

The control rod assembly is more particularly detailed in FIGURE 2 showing a deformable member 40 placed within a bifurcated end of the portion 34 adjacent its inner shoulder such that the link 36 abuts upon a bulbous surface 42 to hold the deformable member within the portion 34 between the bifurcated sides thereof. The link 36 is provided with a drilled opening 44 which is oversized with respect to the diameter of the pin 38 so as to allow the link 36 to compress the bulbous surface 42 of the deformable member 40 before contacting the pin 38. In fact, it is desired that the compression of the deformable member 40 be completed slightly before contact with the pin 38 so that a solid control rod assembly is perfected without creating undue stresses upon the pin 38 and the bifurcated sides of the portion 34.

In FIGURE 3 we have provided another type of power brake system with a modified form of our invention. More particularly, we show a pneumatic power servomotor 46 connected to a vehicle manifold 48 as by a conduit 50, which servomotor is actuated by a brake pedal 52 operatively connected thereto by a control rod assembly 54. Depression of the brake pedal 52 will create a pressure differential within the servomotor 46 to pressurize a master cylinder 56 sending a column of pressurized fluid via conduit 58 to a brake wheel cylinder 60 to apply the brake shoes 62 similar to the system shown in FIGURE 1.

Figure 4:
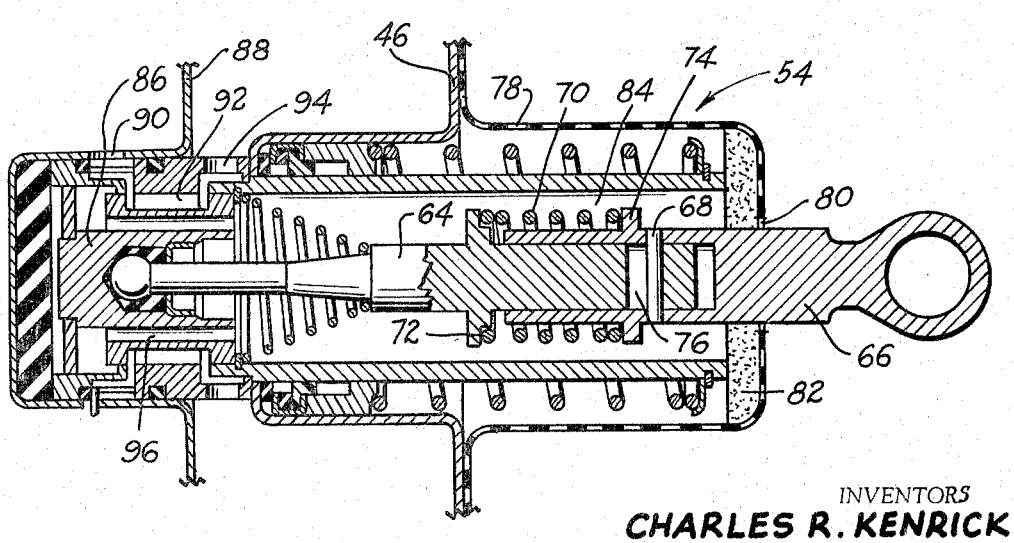
FIGURE 4 is a cross sectional view of the power brake apparatus of FIGURE 3 taken along lines 4—4 thereof.

The control rod assembly 54 is more particularly shown in the cross sectional view of FIGURE 4 showing the control rod assembly to consist mainly of a portion 64 and a link 66 connected by a pin 68 and a coil spring 70 that is operatively inserted between a shoulder 72 of the portion 64 and a flange 74 of the link 66. As seen, the portion 64 is drilled as at 76 to have a hole of greater diameter than the pin 68 to thereby allow compression of the spring 70 prior to bottoming of the pin 68 upon the forwardmost surface of the hole 76 (the pin 68 being fixed in the link 66 and carried thereby). A rubber or neoprene boot 78 is affixed to the servomotor 46 to prevent dust and foreign matter from entering therewithin and bringing about any damage.

The boot 78 is open at its rearward end, as at 80, to provide an entry for atmospheric air that is filtered by a filter 82 immediately therebehind and allowed to pass through a passage 84 about the portion 64 and link 66.

The portion 64 is held by means of a connection to a valve body 86 within a movable wall 88 of the servomotor, which valve body in the released position shown by FIGURE 4 permits vacuum from the engine manifold 48 introduced to the rear of the servomotor 46 by conduit 50 to pass through an opening 90 in the movable wall 88 through a passage 92 and out an opening 94 to equalize the pressure on each side of the wall 88. When the brake pedal is depressed, the valve body 86 closes off the communication of passage 92 with opening 94 and opens communication of passage 96 to passage 92 to thereby port atmospheric pressure to the rear of wall 88 and thereby create a pressure differential across the wall that will pressurize the master cylinder 56 as aforementioned.

Figure 5:
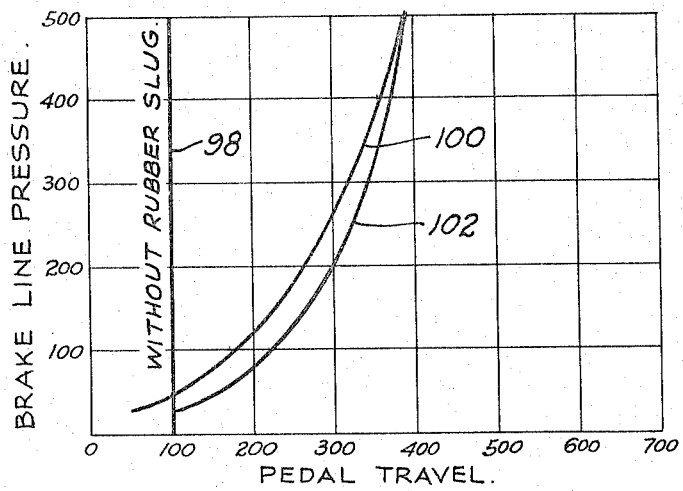
FIGURE 5 is a graphical presentation plotting pedal force and pedal travel vs. brake pressure for a power braking apparatus incorporating one form of our invention.

In FIGURE 5 we have shown a curve for a no travel power brake servomotor of the type depicted in FIGURE 1 showing a comparison between a plot 98 for pedal travel for a unit without our invention and a curve 100 plotted for pedal travel of a unit having a deformable member in the control rod in accordance with our invention. It should be noted that this curve 100 relates to the application of increasing brake pressure, and a curve 102 shows the release of brake pressure characteristics.

Figure 6:
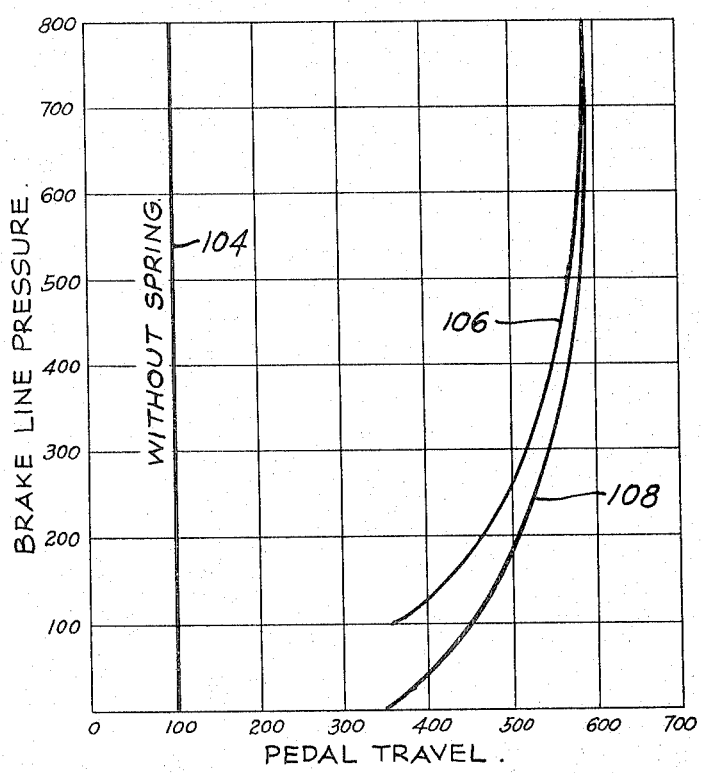
FIGURE 6 is a graphical presentation plotting pedal force and pedal travel vs. brake pressure for a power braking system incorporating another form of our invention.

In FIGURE 6 we have shown a similar comparison between pedal travel 104 for a servomotor of the type shown in FIGURE 3 before incorporation of our invention and pedal travel 106 for the same unit modified by incorporating a device in accordance with the principles of our invention. Curve 108 shows a release plot comparing line pressure and pedal travel for this unit similar to that in FIGURE 5.

The shape of the rubber slug 40 could be materially varied without departing from the scope of our invention. For example, one could use a doughnut or annular shaped elastomeric member; and in the case of the spring one could use a conically shaped spring to provide variable rate characteristics.

As the operation of our device is readily susceptible to those skilled in the art to which our invention relates from the foregoing description and drawings, it is not deemed necessary to provide a step-by-step operation. It should also be readily recognized by those skilled in the art that while we have described but two forms with which we have concerned ourselves in practicing our invention, we do not consider this to be in any way limited of the forms in which it may take. In fact, we maintain the scope of our invention as set forth only in the appended claims.

We claim:
1. For a control means adapted to operate a fluid pressure motor, a means to actuate said control means comprising:
   a brake pedal pivotally arranged with respect to surrounding structure;
   a control rod assembly linking said control means to said brake pedal which control rod assembly includes,
   a portion operatively connected to said control means, said portion having a bifurcated end with an aligned hole through portions of said end,
   a link telescopically arranged with respect to said portion, said link having an axial slot,
   a resilient member arranged between said portion and said link to position said portion with respect to said link and cushion any telescopic motion therebetween, and
   a pin sized to snuggly fit said hole and loosely fit said slot to join said portion and said link with said resilient member interposed in a lost motion connection.

2. A control rod assembly according to claim 1 wherein said resilient member may be characterized as being a rubber slug having a flat face on one end thereof and a bulbous face on the other end thereof.

3. A control rod assembly according to claim 1 wherein said resilient member may be characterized as a coil spring operatively arranged so that one end thereof bears against said portion and the other end thereof bears against said link and allows limited telescopic motion therebetween.

References Cited by the Examiner

UNITED STATES PATENTS

| | | | |
|---|---|---|---|
| 1,841,696 | 1/1932 | Andres | 74—582 X |
| 2,154,361 | 4/1939 | Shieferstein | 74—26 |
| 2,866,317 | 12/1958 | Stelzer | 60—54.5 |
| 2,910,048 | 10/1959 | Ingres | 60—54.6 X |
| 3,159,975 | 12/1964 | Ayers | 60—54.6 |
| 3,198,301 | 8/1965 | Randall | 74—582 |

FRED C. MATTERN, JR., *Primary Examiner.*

F. E. BAKER, *Assistant Examiner.*